United States Patent [19]
Berlin, Jr.

[11] 4,160,973
[45] Jul. 10, 1979

[54] THREE-DIMENSIONAL DISPLAY

[75] Inventor: Edwin P. Berlin, Jr., Huntington, N.Y.

[73] Assignee: Massachusetts Institute of Technology, Cambridge, Mass.

[21] Appl. No.: 840,881

[22] Filed: Oct. 11, 1977

[51] Int. Cl.$^2$ .................. H04N 9/58; H04N 5/70; H04N 3/14; H04B 9/00

[52] U.S. Cl. .................. 340/718; 250/199; 340/24; 340/755; 340/794; 358/88; 358/89; 358/241

[58] Field of Search .............. 358/241, 88, 89; 340/24, 27 N, 324 R, 718, 755, 794; 250/199

[56] References Cited
U.S. PATENT DOCUMENTS

| | | | |
|---|---|---|---|
| 3,023,408 | 2/1962 | Adams | 358/89 |
| 3,154,636 | 10/1964 | Schwertz | 358/241 |
| 3,323,126 | 5/1967 | Malone | 358/88 |
| 3,335,217 | 8/1967 | Bassett | 358/88 |
| 3,371,155 | 2/1968 | Anderson | 358/89 |
| 3,555,505 | 1/1971 | Srogi | 340/24 |
| 3,636,551 | 1/1972 | Maguire | 358/88 |
| 3,846,784 | 11/1974 | Sinclair | 340/336 |
| 3,958,235 | 5/1976 | Duffy | 340/336 |
| 4,023,158 | 5/1977 | Corcoran | 340/324 R |

Primary Examiner—Howard W. Britton
Attorney, Agent, or Firm—Arthur A. Smith, Jr.; Robert Shaw

[57] ABSTRACT

A three-dimensional array that, in preferred form, is a two-dimensional visual display in which a three-dimensional image is achieved by providing movement to scan space in all three dimensions.

31 Claims, 12 Drawing Figures

THREE-DIMENSIONAL DISPLAY

The present invention relates to display systems wherein the appearance of an additional dimension is accomplished by moving an array relative to a viewer.

There exists a need for a relatively economical three-dimensional display which can be interfaced with a computer to supply a three-dimensional image which may be complex and which may be changed with ease. Such display can be used, by way of illustration, for three-dimensional x-ray information in the medical field as well as for non-destructive testing; it can be used, also to exhibit air traffic control information and in the field of computer aided design. In all such uses, the need for continual updating of information is often a requirement, thereby necessitating the transfer of data to the array in real time; such updating would be needed, say, to remove or peel layers from an x-ray image or the like. Some such displays may be provided in color.

Accordingly, it is a principal object of the present invention to provide a three-dimensional display.

Another object is to provide a three-dimensional display which can be computer controlled.

Another object is to provide a three-dimensional visual display wherein the image is easily changed.

Another object is to provide a three-dimensional display which can be viewed from many angles.

A further object is to provide a display wherein a three-dimensional image is shown with a grey scale and/or in color.

A still further object is to provide a visual display of three-dimensional information, whether such information is generated by some suitable image generating device or is solely computer generated or is generated by a combination thereof.

These and still further objects are addressed hereinafter.

The foregoing objects are achieved in a display device wherein a three-dimensional image is generated from, say, a two-dimensional array which is moved to achieve the effect of three dimensions. The array comprises a plurality of light sources; means is provided to energize the light sources in a controllable fashion; and means is provided to move the array to scan a total of three dimensions in the display device. In one embodiment there is disclosed a three-dimensional array which is moved to provide a visual effect not present in the stationary array.

The invention is hereinafter discussed with reference to the accompanying drawing in which.

Figure 1:
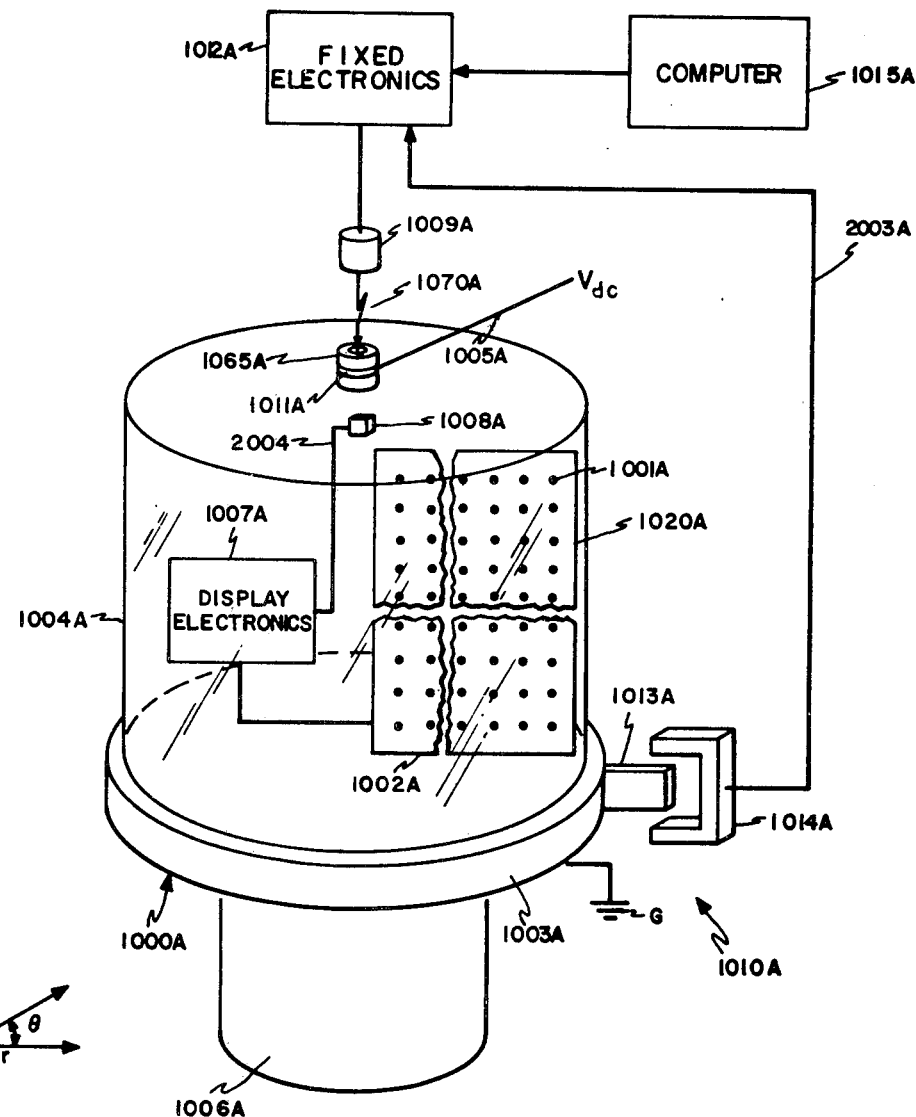
FIG. 1 is a schematic representation, partly block diagram in form, showing an isometric view of a display unit embodying the concepts of the present invention and including a display array, display electronics and fixed electronics.
Figures 5, 5A:
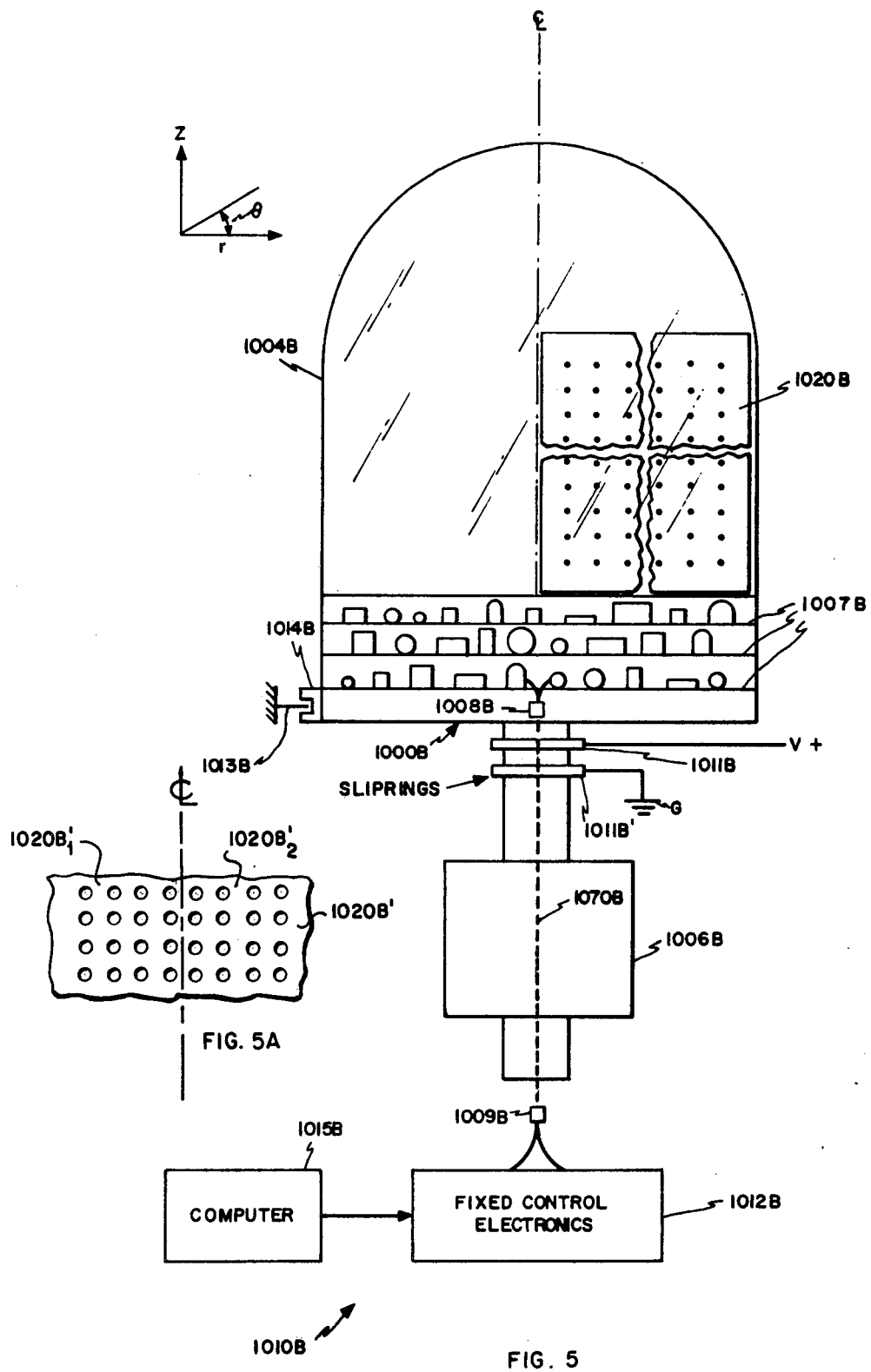
FIG. 5 is a schematic representation, partly block diagram in form, showing a modification of the display system of FIG. 1 and including, among other things, display electronics and fixed electronics.
FIG. 5A is a partial view showing a modification of a portion of the system of FIG. 5.
Figure 6A:
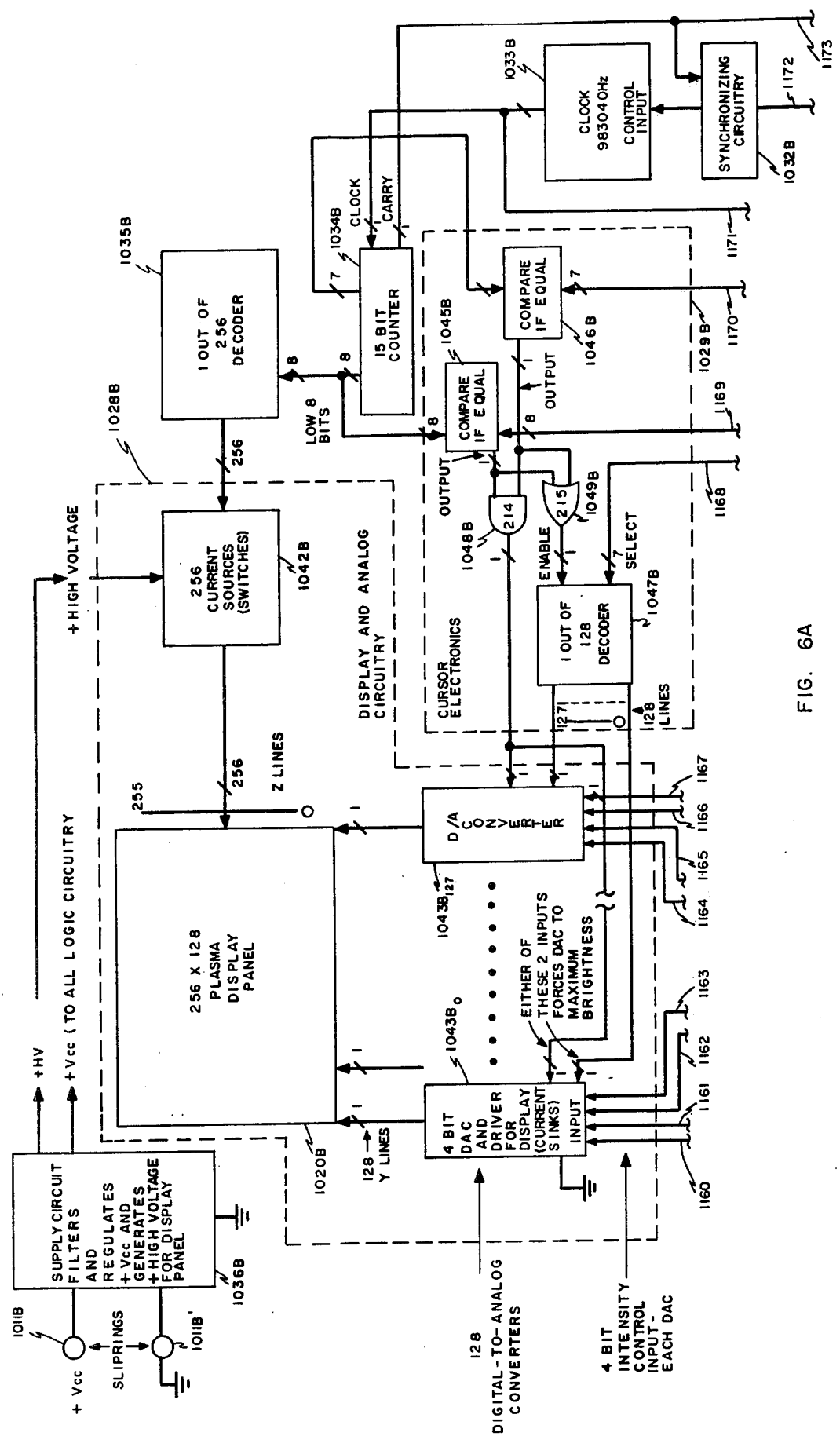
Figure 6B:
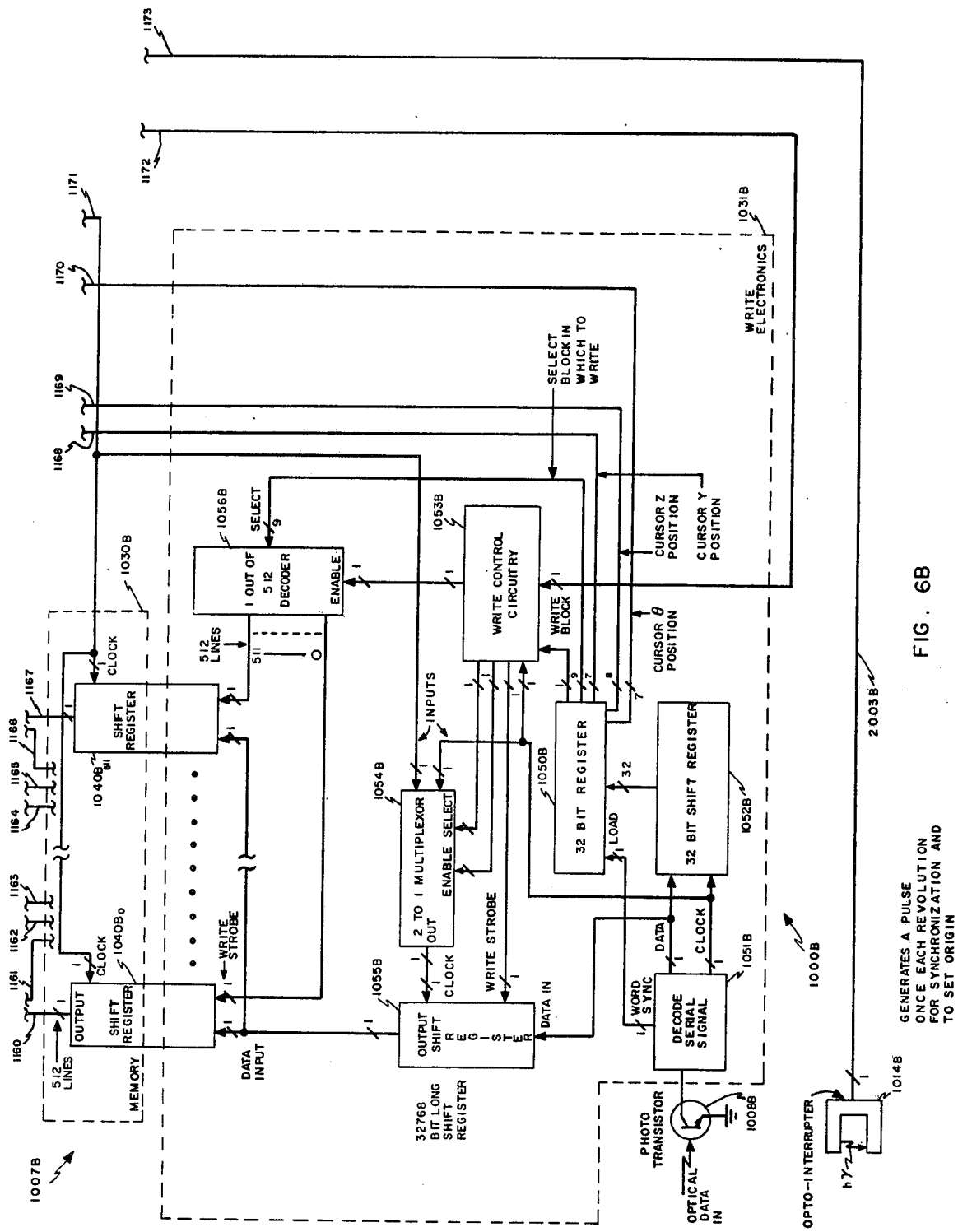
Figure 7A:
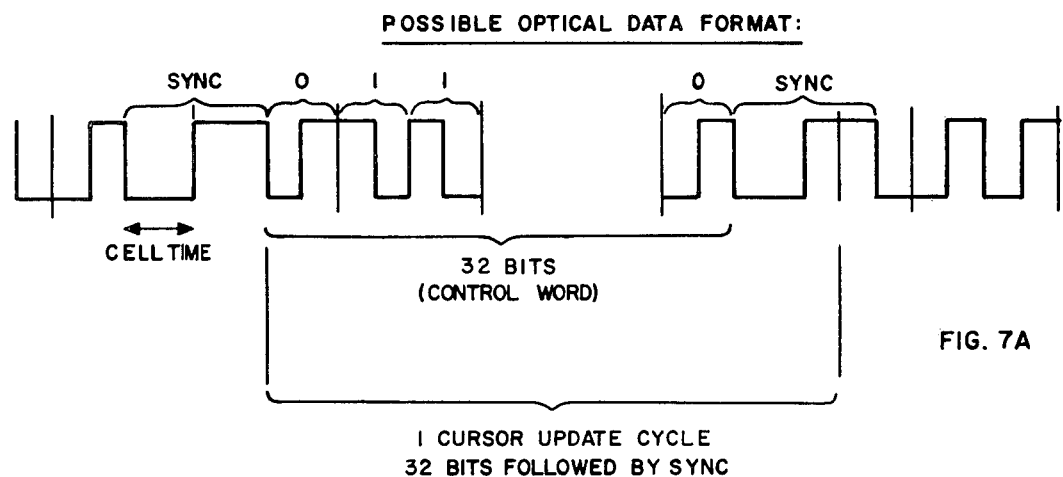
Figure 7B:
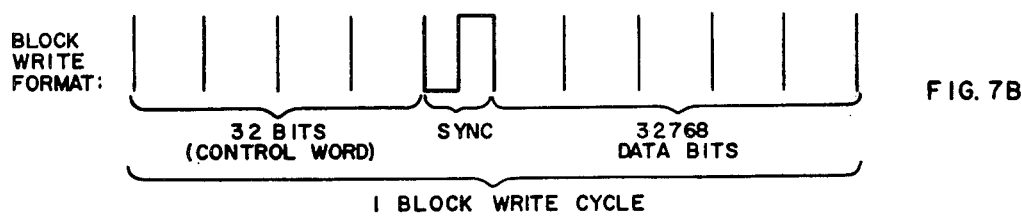
Figure 8:
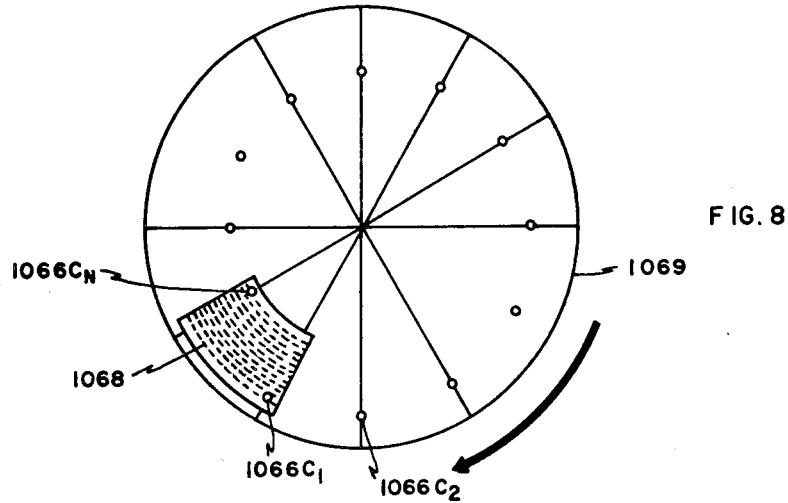
Figure 9:
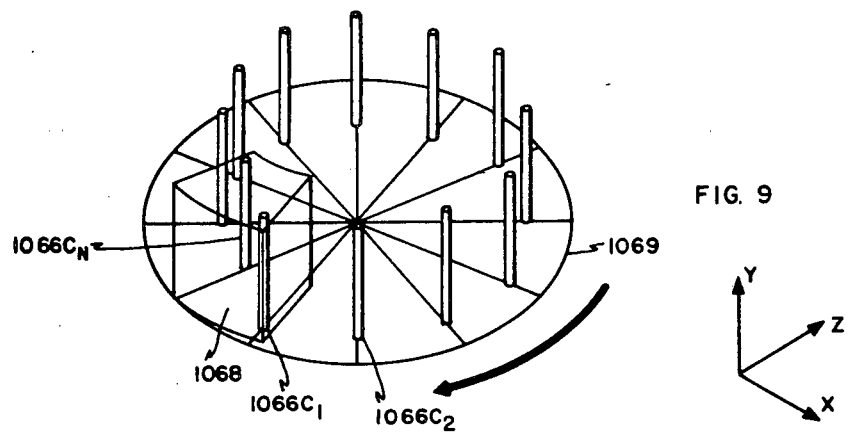

FIGS. 6A and 6B, together, are a diagrammatic representation of the display electronics of FIG. 5, plus a few other circuit elements;

FIG. 7A is a digital message of the type used to effect control of a cursor in the display system of FIG. 5;

FIG. 7B is a digital message of the type used to write upon the display system of FIG. 5;

FIG. 8 is a top view of a display array which is a modification of the array of FIG. 1; and FIG. 9 is an isometric view of the array of FIG. 8.

Before describing the invention in detail, some preliminary comments are in order. The representation labeled 1010A in FIG. 1 is essentially of a three-dimensional display system that the present inventor built as an experimental system or model to establish the efficacy of the concepts herein disclosed; the system labeled 1010B in FIG. 5 is a preferred form of the invention; and FIGS. 8 and 9 show portions of a modification of the system of FIG. 1. In what now follows, the system 1010A is discussed first, then the system 1010B, followed by the embodiment of FIGS. 8 and 9. In the description, numerals above one thousand are used to designate system parts because of the use of lower numerals to designate the number of conductors to a circuit module. For example, the numerals 2000 and 2001 are used in FIG. 4 to represent input channels to fixed electronics 1012A from a computer 1015A, whereas the numerals 15 and 1 adjacent the channels 2000 and 2001, respectively, and the slash marks indicate that the channel 2000 contains fifteen conductors and can accept fifteen bit words in parallel format from the controlling computer 1015A in FIG. 1 and the channel 2001 is a single-conductor channel, connected, in this case, to receive a strobe signal from the computer 1015A.

Turning now to FIG. 1, the display system 1010A is shown comprising a planar two-dimensional array 1020A of sources 1001A of electromagnetic radiation that radiate in the visible region of the electromagnetic spectrum; such sources may be light emitting diodes (LEDs) arranged in rows and columns in a matrix configuration and mechanically supported by a circuit board 1002A; the circuit board in the actual device has a square hole in it to receive the LED matrix and allow it to be seen from both sides, the LEDs being supported in the opening by their conductors. The LEDs 1001A can be energized selectively and the level of radiation can be controlled to several different values producing a gray scale. The array 1020A can be viewed from either side thereof; it is supported at its lower end on a disc 1003A that forms the lower end of a hollow plexiglas cylinder 1004A that is rotatable. The shaft of an electric motor 1006A is secured to the disc 1003A to effect rotation (at 3600 RPM) of the cylinder 1004A plus the internal array 1020A, and so forth. The rotatable elements in FIG. 1 are marked 1000A and include the disc 1003A and the elements within the cylinder 1004A. The ground connection G in FIG. 1 is accomplished by a slip ring (not shown) on the rotor shaft.

Control of the moving LEDs 1001A is accomplished by moving display electronics 1007A which receives electric signals from a phototransistor 1008A which, in turn, receives light signals from an LED 1009A. The light signals pass through a hollow shaft 1065A which contains a slip ring 1011A to permit energizing at $V_{dc}$ (e.g., 5 volts dc connected along a lead 1005A to the slip ring 1011A) of the moving display electronics 1007A and the LEDs 1001A. The voltage $V_{dc}$ appears between the slip ring 1011A and ground G.

The apparatus 1010A is a schematic representation of a very elemental system that was actually built and tested. A digital signal of the type shown at 1016A in FIG. 2 from fixed electronics 1012A is connected to the infrared LED 1009A and converted to an optical signal 1070A which passes through the hollow shaft 1065A and is detected by the phototransistor 1008A which, in turn, is connected as input to the display electronics 1007A. The display electronics, as later discussed, energizes the LEDs in a pattern determined by the digital signal received. The system is reset once each revolution of the cylinder 1004A by an optical interrupter comprising a tooth 1013A on the disc 1003A, that interrupts a light beam of an optical unit 1014A to provide a reset signal that appears once each revolution of the disc 1003A and is applied along the conductor labeled 2003A as input to the fixed electronics 1012A. In the model system 1010A, the array of lights 1001A is updated sixty-four times each revolution, that is, there are in the system 1010A sixty-four sectors per revolution, each sector being that angle through which any particular two-dimensional image is present on the array 1020A. Hence, in the system shown, the image on the two-dimensional array 1020A is scanned sixty-four times each revolution and, typically, the message applied to the array will differ at each sector from all other sectors, the three-dimensional image being a composite consisting of the total of the sixty-four, two-dimensional images. Persistence of vision of the viewer makes all sectors appear to be present continuously with all points in any sector being controllable electronically by a computer or the like. The display (or movable) electronics 1007A and the fixed electronics 1012A are now discussed in greater detail with reference to FIGS. 3 and 4, respectively.

Figure 4:
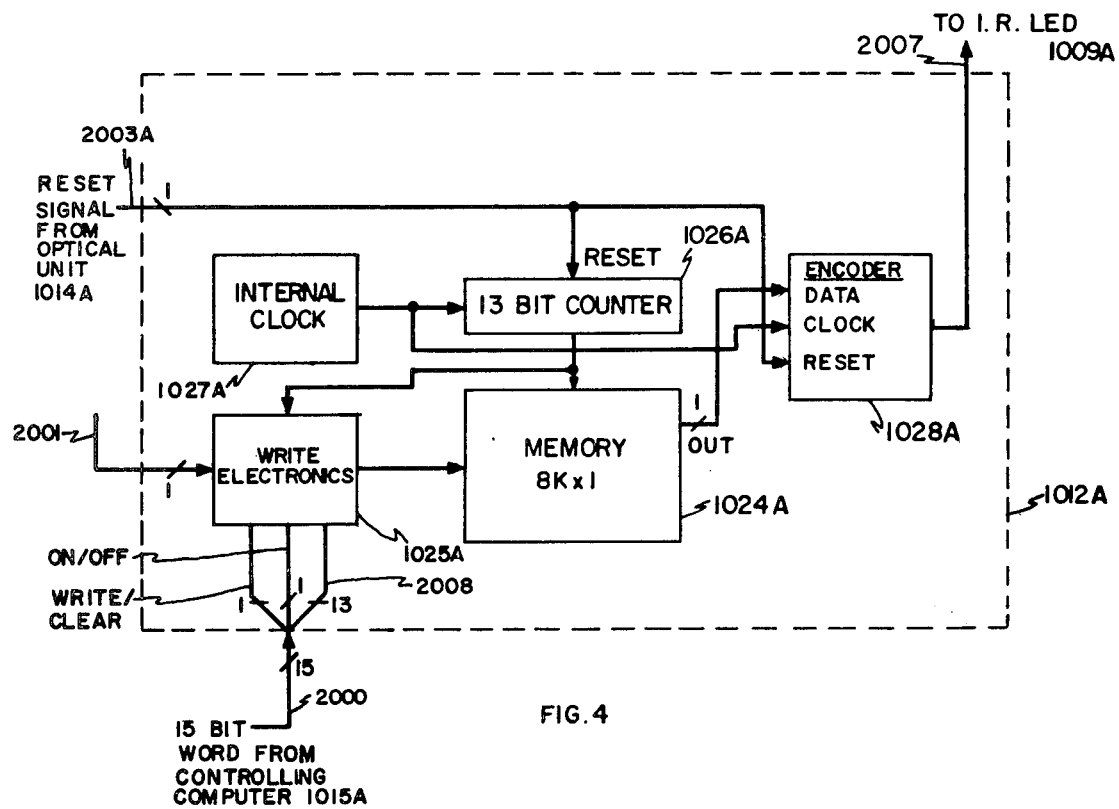
FIG. 4 is a diagrammatic representation of the fixed electronics of FIG. 1.

The fixed electronics 1012A, as shown in FIG. 4, has inputs 2000, 2001 and 2003A and an output 2007 which is connected to the infrared LED 1009A that transmits messages to the rotating parts of the system 1010A. The electronics 1012A includes an 8192 bit memory 1024A which refreshes the array 1020A. In the elemental system 1010A, the memory 1024A is interfaced with the computer 1015A through wirte electronics 1025A; the address portion of the computer input, as is shown in FIG. 4, is connected by a 13-bit address message unit along conductors 2008. The computer 1015A sends a pulse along the conductor 2001 to alter the contents of memory 1024A. If the write/clear bit of the word from the computer 1015A is in the write state, write electronics 1025A writes the bit labeled on/off into the word in memory addressed by the address on conductors 2008. If the write/clear bit is in the clear state, the write electronics 1025A writes the bit labeled on/off into every memory location within the memory 1024A. The 13-bit address corresponds to the 8192 points in display space, that is, the 8×16 points of the array 1020A rotating through sixty-four sectors gives 8192 points (also called picture elements or "pixels" herein). (8K=8192 points; 1K=1024 points; 1M=1024K points=1,048,576.) The memory 1025A is addressed by a 13-bit counter 1026A that is incremented by an internal clock 1027A. The display 1020A in the system 1010A rotates at the rate of sixty revolutions per second and displays 8192 points or pixels or pixels per revolution; so that frequency of the clock labeled 1027A is 491520 Hz. For synchronization, the counter shown at 1026A is reset once each revolution by a signal from the optical unit 1014A in FIG. 1. An encoder circuit 1028A receives as inputs data, clock and reset signals respectively from the memory 1024A, the clock 1027A and the optical unit 1014A and encodes the same to provide an output message on the conductor 2007 that is connected as input to the LED 1009A which, as above noted, transmits the output message to the phototransistor 1008A in FIG. 1; the phototransistor 1008A, in turn, provides the signal that appears at the input labeled 2004 in FIG. 3, as discussed in the next paragraph. A typical serial data format of such output message from the encoder 1028A is shown at 1016A in FIG. 2.

Figure 2:
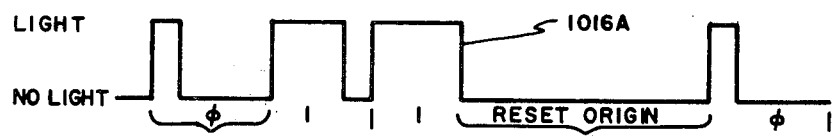
FIG. 2 is a digital message of the type used to write upon the display unit of FIG. 1.
Figure 3:
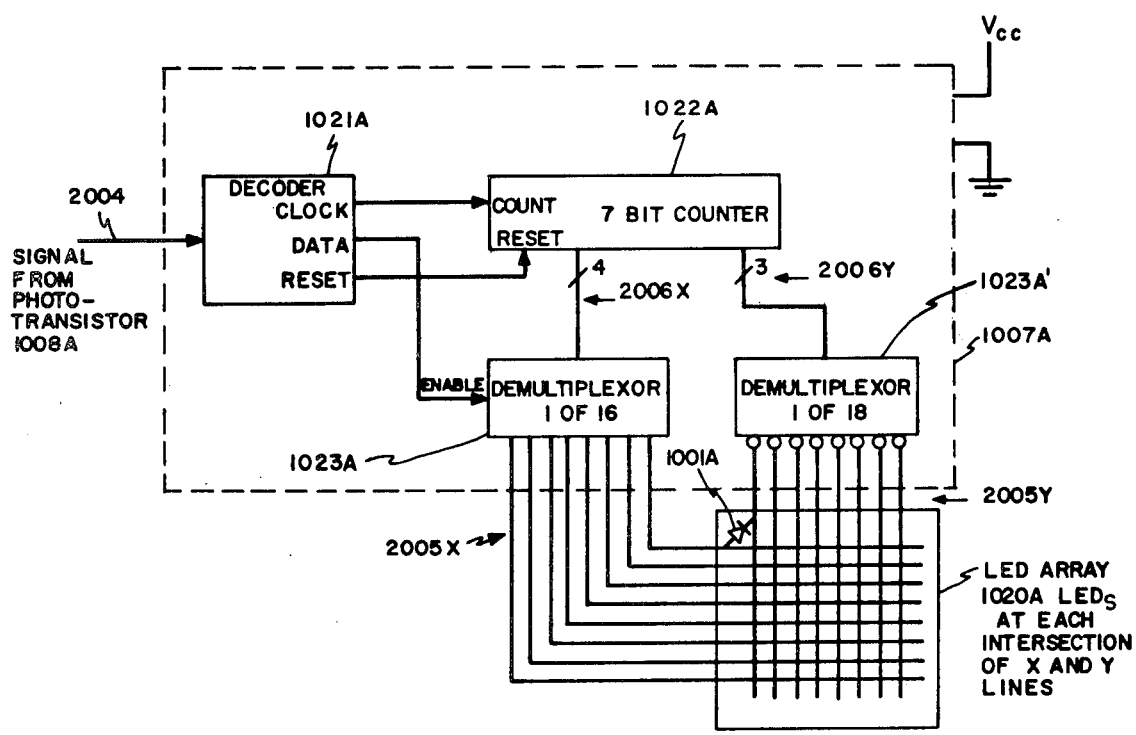
FIG. 3 is a diagrammatic representation of the display electronics of FIG. 1.

The rotating display electronics 1007A, as shown in FIG. 3, comprises a decoder 1021A, a 7-bit counter 1022A and demultiplexors 1023A and 1023A'. The display electronics 1007A receives signals from the phototransistor 1008A at the input 2004 and sends signals to the array 1020A from its outputs 2005X and 2005Y. The input from the phototransistor 1008A is decoded into clock, data and reset signals by the decoder 1021A, the clock and reset signals being connected to the 7-bit counter 1022A whose outputs 2006X and 2006Y (which are 4 and 3 conductors, respectively) are connected as inputs to the decoding circuitry 1023A and 1023A' whose other input is the data output of the decoder 1021A and whose outputs are the outputs 2005X and 2005Y of the display electronics, which serve to select one point in the 16×8 LED array 1020A. More specifically, the data signal enables the demultiplexors 1023A and 1023A' so that the selected LED is illuminated if the data signal applied to the demultiplexor 1023A is a logical "1" and is not illuminated if the data signal is a logical "0". There now follows a description of a preferred form of the visual display invention herein disclosed with reference to FIGS. 5 and 6; in FIGS. 5 and 6, circuit units that perform functions similar to the functional units of FIGS. 1, 2 and 3 are assigned similar designations except that the suffix B replaces the suffix A of FIGS. 1, 2 and 3.

The system 1010B in FIG. 5 comprises a rotatable unit labeled 1000B and stationary elements consisting of a hollow shaft motor 1006B, a light-emitting diode 1009B, fixed control electronics 1012B and a computer 1015B. The rotatable elements include display electronics 1007B (on several circuit boards), a flat array 1020B, a transparent plastic (or glass) cover 1004B, and a phototransistor 1008B. A voltage V+, before, is connected by way of slip rings 1011B and 1011B' to the rotatable elements. An opto-interrupter is shown comprising the elements marked 1014B and 1013B that correspond to the similar elements 1014A and 1013A, respectively, in FIG. 1. A detailed discussion of those elements in FIG. 5 that require further explanation is given below with reference to FIGS. 5 and 6.

The flat plasma display 1020B (gas discharge) which is visible from both sides is rotated with the bell-jar shaped glass or plastic cover 1004B in FIG. 5. The plasma array 1020B is mounted above the display electronics 1007B. The display cover and electronics all rotate together, powered by the motor 1006B mounted at the base of the rotating (i.e., movable electronics. The plasma display 1020B is arranged as 128 by 256 points. It is rotated about an axis, which is a vertical edge of the array 1020B, at 1800 RPM. (It should be noted, however, that the axis of rotation may be at an intermediate region of the planar array; e.g., see FIG. 5A wherein the array labeled 1020B' has an intermediate axis of rotation with sections 1020B$_1$' and 1020B$_2$' that form the array 1020B' being at either side of the axis.) The radius is 128 pixels (i.e., picture elements) long and the height is 256 pixels. The electronics scan 128 sectors per revolution, thus, the total number of pixels is 128×256×128 or 4,194,304 points which can be displayed by the three-dimensional display. Using a four-bit gray scale (i.e., four-bits per pixel), the total memory required is 16 million bits. CCD (i.e., charge coupled device) shift registers are used for this memory which rotates along with the plasma display and related electronics. (Other types of memory may be used in such a system, e.g., magnetic discs, bubble memories, etc.)

The display is driven in line dump mode. This means that as the height is scanned through 256 possible values, an entire horizontal line of 128 pixels is presented in parallel at once to the display at each value of the height coordinate. This parallel operation allows the data rates to be reasonable rather than impossible. The rates are: 30 frames per second, 30×128 or 3840 sectors per second, and 3840×256 or 983040 horizontal bars per second. Thus, the data rate for the plasma display is under 1 MHz on each of 512 lines.

The array 1020B must present an entire line of 128 points at once and each point requires 4 bits for intensity; hence, data as 512 bits in parallel available from the CCD memory are needed.

As the rotatable unit 1000B of the display spins, the rotating electronics 1007B reads the picture information from its internal memory and displays it. The rotating electronics 1007B causes these bits to be fed into the plasma array 1020B and causes the array to be scanned properly. The circuitry also provides for writing into the memory, as described below.

All control and data reach the display electronics modulated over an infrared light beam from the LED 1009B concentric with the axis of rotation of the display, the shaft through the motor which drives the display being hollow, as above indicated. The data rate over the beam may be any practical value since these data are received asynchronously with respect to the rotating electronics. A transmission rate of at least one MHz is practical. This requires the time to load the display memory (i.e., ~sixteen million bits) to be on the order of fifteen seconds. Synchronizing pulses, which set the origin of the display, are generated by the opto-interrupter 1014B which is a light-emitting diode/-phototransistor pair mounted on the rotating display. The fixed interrupting plate 1013B interrupts the beam in the opto-interrupter as the display rotates, generating a pulse once every revolution (i.e., a frequency of 30 Hz).

The fixed control electronics 1012B communicates to the display entirely over the optical link. The link is one-directional; no information is returned by the display electronics. Data are written into the rotating memory one block at a time; there are 512 blocks, each 32768 bits long. All the fixed control electronics 1012B does is take images from the computer, format the data for transmission over the optical data link to the rotating electronics, and send the data and some control signals to the display. When the display memory is not being updated, this circuitry 1012B is sending cursor coordinates to the display in order that the user can move a real time cursor within the display space. This interface (i.e., the circuit 1012B) can make the display appear as almost anything to the computer. It might appear as a buffered direct-memory-access device, as memory within the address space of the computer, or, simply, as programmed input/output.

Power is supplied to the rotating electronics through two brushes to the slip rings 1011B and 1011B′ mounted on the motor shaft. This supplies a single voltage which is filtered and regulated by the rotating electronics. The rotating electronics also contains a circuit 1036B to generate all voltages needed by the rest of the device. This, as known to workers in this art, is typically 5 or 10 volts for the logic, about 200 volts for the plasma display, and, perhaps, some other voltages for memory devices.

FIGS. 6A and 6B, together, show the rotating display electronics 1007B in block diagram from plus the plasma display panel 1020B and associated circuitry within a display and analog circuitry block 1028B. (It is to be noted here that FIGS. 6A and 6B are to be taken together to portray a single circuit diagram for purposes of the explanation at this juncture; the conductors labeled 1160–1173 in both figures designate the connection points interconnecting the circuitry in the two figures.) The display electronics 1007B in FIGS. 6A and 6B consists of cursor electronics 1029B, memory 1030B (comprising shift registers $1040B_0 \ldots 1040B_{511}$), write electronics 1031B, synchronizing circuitry 1032B, a clock 1033B, a counter 1034B, a decoder 1035B, and filter and voltage converter/regulator circuit 1036B. In what now follows, there is first described the operation of the display when there is already an image stored in the CCD memory, then there is described the manner in which the memory is loaded by the controlling electronics.

The 15 bit counter 1034B specifies which horizontal line of pixels is currently being displayed; 8 bits specify one of 256 horizontal lines per sector and 7 bits specify one of 128 sectors, a total of 15 bits. The counter 1034B is caused to count by the clock 1033B, which also causes the display memory shift registers $1040B_0 \ldots 1040B_{511}$ to shift and circulate the data stored in them. To explain the display of one frame, that is, one revolution of the array, it is assumed that initially the counter 1034B is in a state of all zero's which means it is ready to display the first line of pixels. Now, as the display rotates, a pulse is generated by the opto-interrupter 1014B (once every revolution). The pulse from the opto-interrupter 1014B is used by the synchronizing circuitry 1032B which can be a simple phase locked loop circuit and which adjusts the frequency of a clock 1033B to any fluctuations in motor speed. It is this pulse that sets the origin (i.e., the sector at which the counter 1034B is all zero's). The clock 1033B must generate 32768 pulses during the time that the display makes one revolution. At 1800 RPM, this frequency is 983040 Hz. The decoder 1035B applies a high voltage to one of the 256 horizontal electrodes in the plasma panel 1020B through high-voltage switches 1042B. The horizontal electrode is selected by the lower 8 bits of the counter 1034B. The shift registers $1040B_0 \ldots 1040B_{511}$ are 32768 bits long and they produce 512 bits in parallel. The 512 bits can be considered 128 groups of four, with each group of four specifying the intensity of the corresponding pixel along the horizontal scan line selected by the decoder 1035B. The intensity is varied by digitally controlled current sinks $1043B_0 \ldots 1043B_{127}$ (which also serve as D/A converters), one for each pixel on the selected horizontal line in the plasma display 1020B. So far, the bottom line (i.e., line zero) of the first sector (i.e., sector zero) has been displayed. Now a clock pulse is generated by the clock 1033B. The counter 1034B is incremented by one and the decoder 1035B causes the drivers 1042B to supply current to the next horizontal line to be scanned in the plasma panel 1020B. The clock 1033B also shifts the memory 1030B so that the intensity information for the next line will be available to the driving circuitry, $1043B_0 \ldots 1043B_{127}$.

The drivers $1043B_0 \ldots 1043B_{127}$ now cause the currently selected line to display the image corresponding to the image information for that line in the display space stored in memory 1030B. As more clock pulses are generated, the counter 1034B and the decoder 1035B effect scanning of the plasma panel 1020B. The memory 1030B and the drivers $1043B_0 \ldots 1043B_{127}$ generate any arbitrary flat image on the plasma panel. By the time all 256 horizontal lines on the plasma panel 1020B have been scanned, the panel has rotated 1/128 of a revolution (i.e., one sector) and the scanning of the panel begins again in this new position so as to effect scanning of the next subsequent sector. The upper 7 bits of the counter 1034B correspond to one of 128 sectors around the display. After 128 sectors have been displayed (i.e., 32,768 clock pulses have been generated) an entire frame has been displayed and the array is back at the origin again. The data in the shift registers $1040B_0 \ldots 1040B_{511}$ are recirculated and are available again after 32,768 clock pulses have been generated so that the same image may be displayed on the next revolution. When 32,768 clock pulses have been generated, 128 sectors of 256 lines have been displayed and the carry output from the counter 1034B generates a pulse. The pulse thus generated is used by the synchronizing circuitry 1032B along with the pulse from the opto-interrupter 1014B to synchronize the clock 1033B to generate exactly 32,768 pulses every revolution. The clock 1033B is synchronized by the carry pulse from the counter 1034B into synchronizing circuitry 1032B so that the counter is addressing the first line of the first sector (i.e., counter is all zero's) at the time that a pulse is generated by the opto-interrupter 1014B. In this way, the display electronics 1007B is synchronized to the motor 1006B and an arbitrary origin is set by the placement of the plate 1013B that interrupts the opto-interrupter 1014B.

Digital comparators 1045B and 1046B, a decoder 1047B, an AND gate 1048B and an OR gate 1049B form the cursor electronics 1029B. The comparator 1045B generates a true outpu if, and only if, the low 8 bits of the counter 1034B (i.e., horizontal line address) are equal to the 8-bit cursor z position from a 32-bit register 1050B in the write electronics 1031B. The comparator 1046B, similarly, compares the remaining 7 bits of the counter 1034B (sector address) with the 7-bit cursor theta position (i.e., sector address) from the register 1050B. The decoder 1047B takes its select input from the cursor r position (7 bits) from the register 1050B and generates one of 128 outputs when it is enabled. Each output causes the corresponding drivers $1043B_0 \ldots 1043B_{127}$ to drive the corresponding pixel selected by decoder 1047B to full brightness. The decoder 1047B is enabled when either comparator 1045B or the comparator 1046B outputs is true, by the OR gate 1049B. Thus, if the current sector matches the cursor theta ($\theta$) position, then the decoder 1047B is enabled for the duration of that entire sector and an intensified vertical line is scanned at the cursor r position. The decoder 1047B is also enabled if the current height (horizontal scan line) matches the cursor z position, intensifying a pixel at the cursor r and z positions for all sectors, causing a circle in the r-theta plane to be intensified. Finally, if both cursor theta and z coordinates match the current coordinates, as indicated by the output of the AND-gate 1048B, the drivers $1043B_0 \ldots 1043B_{127}$ are forced to maximum intensity so as to illuminate a horizontal line through the specified cursor position. The resulting cursor, as specified by 22 bits of the register 1050B cursor theta, r, and z coordinates, will look like a vertical line, a horizontal line, and a circle lying in a horizontal plane and centered on the rotational axis of the display, all three intersecting at the selected cursor position.

Serial optical data from the computer interface 1012B is received by phototransistor 1008B and decoded by decoding circuitry 1051B in the write electronics 1031B. A possible format for these data is shown in FIGS. 7A and 7B. FIG. 7A shows a cursor update cycle which consists of a 32-bit control word followed by a synchronizing pattern. The circuitry 1051B decodes the serial format into a data line, a clock line to clock the data, and a word sync pulse which is generated whenever the sync pattern is detected. Data are clocked serially into a 32-bit shift register 1052B and, when an entire 32-bit control word has been assembled, word sync loads this control word into the register 1050B. This cycle repeats as long as the contents of the memory 1030B are not being modified. Thus, with a typical serial data rate of 1 MHZ, the register 1050B can be updated every 34 microseconds. Twenty-two bits of this register specify the location of the cursor. In this way, the cursor position may be updated in real time without requiring an update of the entire image. The remaining ten bits of the register 1051B are used for loading the memory 1030B with a new image. Nine bits specify which of the 512 shift registers are to be loaded during a block write cycle and the last bit, if it is set, initiates the write cycle. The cycle begins with a control word containing the address of the particular shift register $1040B_0 \ldots 1040B_{511}$ to be written into and a one in the bit that starts the write cycle. At this juncture, the register 1050B is loaded and write control circuitry 1053B begins the write sequence while the computer interface 1012B sends the 32,768 bits to be written into the selected register of the memory 1030B in FIG. 6B. The control circuitry 1053B first causes a multiplexor 1054B to shift the serialdata into a 32,768 bit register 1055B using the decoded clock signal from the circuitry 1051B. When all 32,768 bits have been loaded into the temporary register 1055B, the control logic 1053B disables the multiplexor 1054B until the carry output from the counter 1034B indicates that the display memory 1030B is ready to shift data in starting at the origin. At this time, the multiplexor 1054B sends the system clock signal pulses from the clock 1033B to the register 1055B to cause it to shift data out. A decoder 1056B also is enabled at this time to cause the selected shift register to shift out the old data to the display and to shift in the new information coming from the shift register 1055B. After 32,768 bits have been shifted in, the control circuitry 1053B returns to its quiescent state and more cursor update cycles or write cycles may proceed.

This system requires about thirty seconds to load a new image into the display memory 1030B from the computer 1015B. Power supplied through the slip rings 1011B and 1011B' is processed by the supply circuitry 1036B to generate all voltages needed by the rotating electronics.

The fixed control electronics 1012B in FIG. 5 performs a relatively simple function: it generates serial data which modulates the LEDs; it continually updates the cursor position (the data may come from the controlling computer 1015B or from another input device such as, for example, a joy-stick with three degrees of freedom); it fetches image information from the computer 1015B; and it transmits data to the rotating electronics over the optical data path. The circuit 1012B is interfaced to the computer 1015B that controls the display.

Another configuration of the display is an extension of Nipkow's disc, an old method of mechanically scanning a two-dimensional television raster. Briefly, the variation of Nipkow's system is given below.

If a circular disk is divided into sectors and a point light source is placed at each boundary between sectors with each source slightly closer to the center of the disk than the source on the previous boundary and the disk is rotated about its center in, say, a vertical plane, then each source would trace a different concentric circle about the center of the disk collectively and sources would scan a raster across a small and approximately square patch over one of the sectors. By electrically connecting the light sources together and modulating them with an appropriate signal, a two-dimensional image will be displayed where the raster is scanned.

Now, if each light source in Nipkow's disk is replaced by a column (i.e., columns $1066C_1 \ldots 1066C_N$ in FIGS. 8 and 9) of sources arranged vertically in a straight line, then as the wheel rotates in, say, a horizontal plane, each column scans a portion of the surface of a cylinder, and, since the columns get closer to the axis of rotation of the wheel, they successively scan cylindrical surfaces farther away from the viewer. The viewer looks into the side of the wheel, into a roughly rectangular box shaped portion 1068 of the wheel. This display space is approximately scanned in cartesian coordinates. The x coordinate is the amount the disk has rotated within the current sector, the y coordinate selects a light source on the columns of sources, and the z axis (away from the viewer) is determined by which column is within the display space. The display is viewed from the edge of the wheel and the image cannot be seen from all directions because the rest of the display obstructs the view. FIG. 8 is a top view of such a configuration and FIG. 9 is a perspective view of the same thing. The necessary electronics is not shown in FIGS. 8 and 9. Briefly, what is shown, is a wheel 1069 that rotates in the x-z plane about a y-directed axis. The rods $1066C_1 \ldots 1066C_N$ are mounted on this wheel oriented in the y-direction, as shown in FIGS. 8 and 9. Each rod contains a plurality of light sources with each light source being modulated so as to produce a three-dimensional image within the display space 1068, as shown in FIGS. 8 and 9.

In the embodiments of the inventions shown and discussed above, motion to provide the desired image is effected by rotation of the array, but such motion can be linear by translational movement or, conceptually at least, by short-distance, oscillatory motion of the arrays disclosed.

Further modifications of the invention herein disclosed will occur to persons skilled in the art and all such modifications are deemed to be within the spirit and scope of the invention as defined by the appended claims.

What is claimed is:

1. A three-dimensional display device that comprises, in combination: a two-dimensional array comprising a plurality of light sources; energizing means, comprising fixed electronics and movable display electronics, to activate the light sources in a determined fashion to produce a two-dimensional image; and means to provide motion of said two-dimensional array to provide a three-dimensional image, as well as of the movable display electronics, so that the movable display electronics and the two-dimensional array move together as a unit; said energizing means being controlled to modulate the lights as the two-dimensional array moves to produce said three-dimensional image.

2. A display device as claimed in claim 1 wherein the two-dimensional array is planar and has provision to be rotated about an axis of rotation to provide said motion.

3. A display device as claimed in claim 2 wherein the axis of rotation is at one edge of the planar array, the light sources being visible from both sides.

4. A display device as claimed in claim 2 wherein the axis of rotation is at an intermediate region of the planar array.

5. A display device as claimed in claim 1 wherein the means to provide motion is operable to provide oscillating motion.

6. A display device as claimed in claim 1 wherein the energizing means acts to modulate the lights in at least one of color and intensity.

7. A display device as claimed in claim 1 wherein said array a large number of comprises LEDs arranged in rows and columns in a matrix configuration and connected to be selectively energized to produce said two-dimensional image.

8. A display device as claimed in claim 7 wherein the energizing means is operable to control the level of intensity of light emitted by each LED to produce a grey scale.

9. A device as claimed in claim 8 wherein said means to provide motion effects rotary movement of the array about an axis.

10. A device as claimed in claim 9 wherein the output of the fixed electronics is connected to energize a fixed LED whose output radiation is transmitted to an optical transducer associated with the two-dimensional array and adapted to move with the two-dimensional array and receive the message from the fixed LED and to convert the message to an electric signal which is connected as input to the movable electronics.

11. A device as claimed in claim 10 wherein the optical transducer is a phototransistor.

12. A display device as claimed in claim 10 that includes computer means connected as input to the fixed electronics to supply data from which said messages are derived, the image in the two-dimensional array being updated or scanned many times each revolution, each updating or scanning period being a sector or angle through which any particular image is present on the array.

13. A display device as claimed in claim 12 having means to reset the energizing means once each revolution of the array.

14. A display device as claimed in claim 12 wherein the movable display electronics comprises cursor electronics, memory and synchronizing circuitry, interconnected.

15. A display device as claimed in claim 1 wherein said array comprises a plasma (gas discharge) display arranged as a matrix of cells and connected to be selectively energized to produce said two-dimensional image.

16. A display device as claimed in claim 15 wherein the energizing means is operable to control the level of intensity of light emitted by each cell to produce a grey scale.

17. A device as claimed in claim 16 wherein said means to provide motion effects rotary motion about an axis.

18. A device as claimed in claim 17 wherein the output of the fixed electronics is connected to energize one or more fixed LEDs whose output radiation is transmitted to one or more optical transducers associated with the two-dimensional array and adapted to move with the two-dimensional array and receive the messages from the fixed LEDs and to convert the messages to electrical signals which are connected as input to the movable electronics.

19. A device as claimed in claim 18 wherein the optical transducers are phototransistors.

20. A device as claimed in claim 18 that includes computer means connected as input to the fixed electronics to supply data from which said messages are derived, the image in the two-dimensional array being updated or scanned many times each revolution, each updating or scanning period being a sector or angle through which any particular image is present on the array.

21. A display device as claimed in claim 20 having means to reset the energizing means once each revolution of the array.

22. A display device as claimed in claim 20 wherein the movable display electronics comprises memory and synchronizing circuitry, interconnected.

23. A display device as claimed in claim 22 wherein the display electronics also includes circuitry for displaying a movable cursor.

24. A display device as claimed in claim 1 wherein the image information is presented to said array in parallel, that is, information to modulate several light sources is presented at one instant of time to said array.

25. A display device as claimed in claim 24 wherein said image information is stored in a memory.

26. A display device as claimed in claim 25 wherein said memory is arranged so as to move with the array.

27. A display device as claimed in claim 24 wherein said image information originates at some fixed and/or distant source and is transmitted to the moving array in parallel.

28. A display device as claimed in claim 27 wherein said method of transmission is by direct electrical connection.

29. A display device as claimed in claim 27 wherein said method of transmission is by modulated sources of electromagnetic radiation, including radiation in the visible and infrared spectrum.

30. A display device to exhibit a three-dimensional image, that comprises, in combination: an array of light sources; energizing means to power the light sources in a determined fashion; and means to move the array and the energizing means together in a determined fashion; the energizing means and the means to move the array acting in combination with the array to effect scanning to provide a three-dimensional image.

31. A display device that comprises, in combination: three-dimensional array means comprising a plurality of sources of electromagnetic radiation that radiate in the visible region of the electromagnetic spectrum; energizing means, comprising electronics fixed in space and display electronics movable in space, operable to activate the sources of visible electromagnetic radiation to produce a three-dimensional image; and means providing motion to said three-dimensional array means to effect scanning, as well as to the movable electronics, to provide simultaneous movement to the array means and the movable electronics; said energizing means being controlled to modulate the sources of visible electromagnetic radiation in a controllable fashion.

* * * * *